COLVILLE & SHEPHERD.
Peanut Thrasher.
No. 18,436. Patented Oct. 20, 1857.
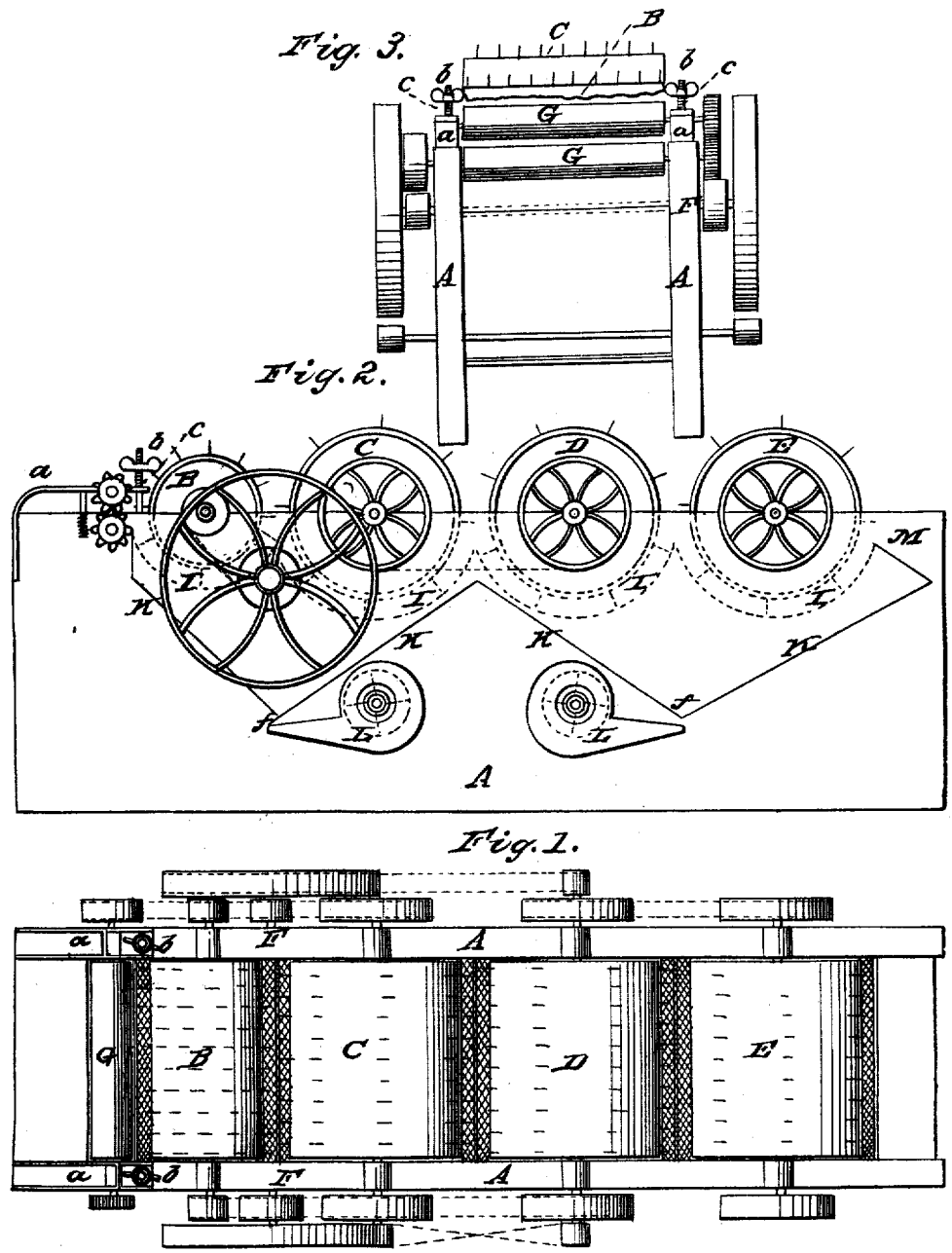

UNITED STATES PATENT OFFICE.

THOS. L. COLVILLE, OF WILMINGTON, NORTH CAROLINA, AND SAML. SHEPHERD, OF NASHUA, NEW HAMPSHIRE.

THRESHING-MACHINE FOR BEATING OFF PEANUTS FROM THEIR VINES.

Specification of Letters Patent No. 18,436, dated October 20, 1857.

*To all whom it may concern:*

Be it known that we, THOMAS L. COLVILLE, of Wilmington, in the county of New Hanover and State of North Carolina, and SAMUEL SHEPHERD, of Nashua, in the county of Hillsboro and State of New Hampshire, have invented a new and useful Machine for Beating Off Ground or Pea Nuts from Their Vines, of which the following is a full, clear, and exact description, reference being had to the accompanying drawings, making part of this specification, in which—

Figure 1 is a plan, the guard or covering of the cylinders being removed; Fig. 2, a longitudinal elevation; Fig. 3, an end view.

The object of our invention is to obtain a machine for separating or beating off from their vines " ground " or " pea nuts " as they are more commonly called.

To enable others skilled in the art to understand and use our invention we will proceed to describe the manner in which we carried out the same.

In the drawings A is the frame of the machine in suitable bearings in which are carried the beating cylinders B, C, D, and E. These cylinders are furnished with short teeth for beating off the nuts from their vines. They are driven by bands on suitable pulleys on their respective shafts, which receive their motion from the main or driving shaft F.

Near the front of the machine are placed two feed rolls G, (Fig. 3) which are covered with india rubber or other elastic material for the purpose of holding on to the vines and nuts while the beaters tear them one from the other, the elastic covering preventing the rolls from crushing the nuts. They are hung the one in stationary bearings in the frame and the other in the pieces *a*. These pieces are secured at one end to the frame, and the other end vibrates on the screw rods *b*. A spiral spring *c*, is placed on each of the rods *b*, between the piece *a*, and a thumb nut *e*, on the rod. By turning these nuts the pressure of the rolls is regulated.

Beneath the cylinders B, C, D, and E, and supported in a proper manner in the frame, is a screen I, placed as shown by the dotted lines, Fig. 2. This may be of wire or of sheet metal perforated, the meshes or holes being of a proper size to allow the pea nuts to drop through. Beneath this are arranged the aprons K, Fig. 2, extending across the machine, on which the nuts fall and are conducted to the openings *f*, where they leave the machine. As they drop out of the machine on either side they receive a current of air from the fans L placed beneath. These are driven by suitable bands from a pulley on the main shaft.

The operation of this machine is as follows: The pea nuts with the vines to which they are attached are drawn in by the feed rolls G, and are operated upon in succession by the toothed cylinders B, C, D, and E, by which the nuts are separated from the vines, the nuts falling through the screen I, onto the inclined aprons K, and thence passing out of the machine at *f*, while the vines pass out of the machine at M. As it is found that the vines do not sometimes require so much beating to free the nuts as at other times, one or more of the toothed cylinders may be dispensed with when it is found advisable.

We do not claim the within described machine or any portion thereof when used for other purposes than those herein designated; but What we do claim as our invention and desire to secure by Letters Patent, is—

1. The within described machine for beating pea nuts from their vines, consisting essentially of the elastic feed rolls G, the screen I, and the beating cylinders B, C, D, and E, operating in the manner substantially as set forth.

2. We claim the elastic feed rolls G operating in the manner substantially as herein described.

THOS. L. COLVILLE.
SAMUEL SHEPHERD.

Witnesses:
THOS. R. ROACH,
THOS. L. GLOVER.